United States Patent [19]

Hughes

[11] Patent Number: 5,407,573
[45] Date of Patent: Apr. 18, 1995

[54] CONTINUOUS FLOW WATER-PURIFYING DEVICE

[75] Inventor: Douglass E. Hughes, Boulder, Colo.

[73] Assignee: Alpine Water Purification, Inc., Boulder, Colo.

[21] Appl. No.: 69,600

[22] Filed: Jun. 1, 1993

[51] Int. Cl.⁶ ............................ C02F 1/42; C02F 1/50
[52] U.S. Cl. .................... 210/266; 210/282; 210/284; 210/287
[58] Field of Search ............... 210/266, 282, 688, 764, 210/663, 753, 287, 284

[56] References Cited

U.S. PATENT DOCUMENTS

| | | | |
|---|---|---|---|
| 4,555,347 | 11/1985 | O'Dowd et al. | 210/764 |
| 4,769,143 | 9/1988 | Deutsch et al. | 210/266 |
| 4,888,118 | 12/1989 | Barnes et al. | 210/764 |
| 4,995,976 | 2/1991 | Vermes et al. | 210/502.1 |
| 5,061,367 | 10/1991 | Hatch et al. | 210/350 |
| 5,126,044 | 6/1992 | Magnusson et al. | 210/287 |
| 5,269,919 | 12/1993 | von Medlin | 210/266 |
| 5,308,482 | 5/1994 | Mead | 210/207 |

FOREIGN PATENT DOCUMENTS

87/01688 3/1987 WIPO .................................. 210/266

*Primary Examiner*—Cynthia L. Nessler
*Attorney, Agent, or Firm*—William Nitkin

[57] ABSTRACT

A filter for disinfecting non-potable water disposed in line in a water delivery pipe such filter having a plurality of aligned chambers is disclosed. The first chamber contains biocidal resin which imparts a biocide to the water as it passes therethrough. The water then passes through a turbulating disk to an extended contact time chamber of a selected cubic volume to allow further contact time between the biocide and any microorganisms in the water. The water then passes through a biocide removal chamber containing media which removes the biocide from the water. The water then passes through a chamber containing bacteriostatic media which acts to prevent back contamination from the effluent end of the filter. The water then passes through a 3-micron screen which acts to retain protozoan cysts within the filter as the water passes on in the water delivery pipe.

8 Claims, 1 Drawing Sheet

CONTINUOUS FLOW WATER-PURIFYING DEVICE

BACKGROUND OF THE INVENTION

1. Field of the Invention

The device of this invention resides in the area of water filters for the disinfection of non-potable water and more particularly relates to a continuous flow, in-pipe-line filter having a high flow rate and having a plurality of linearly aligned, internal chambers the contents of which interact with the water passing therethrough to destroy a broad range of pathogenic microorganisms in such water.

2. Description of the Prior Art

Non-potable water is currently treated to remove or destroy pathogenic microorganisms which cause intestinal diseases. Such treatments can utilize submicron filtration, ultraviolet light, ozone, and disinfection systems which utilize a wide range of disinfecting chemicals such as chlorine and a large variety of filter media well known in the prior art. Certain disinfection processes use biocidal resins through which the water is passed which biocidal resins can include resins previously treated in such a manner as to release a level of biocide such as iodine/iodides into the water. Such biocides function by destroying the outer cell wall of the microorganism when the microorganism comes in contact with the released biocide. A minimum contact time is often necessary for the destruction of pathogenic bacteria and most viruses. The longer the contact time, the greater the kill rate and efficiency of the device. Therefore, the destruction of such microorganisms has traditionally been accomplished by using a large volume of biocidal resin and channeling the water flow through such biocidal resin to achieve the necessary interaction time between the released biocide such as iodine/iodide and the microorganisms. It is undesirable, after the water has been so treated, to leave the biocide in the water because of the many health hazards that result from the consumption of any biocide over an extended period of time. Some people are allergic to Certain biocides such as iodines; and common biocides, such as chlorine, have recently been associated with bladder cancer. In some instances in the prior art where influent water to be treated is highly contaminated, the volume of the biocide is increased, a process whereby some or all of the biocide is left in the effluent water. Treated water still bearing the biocide is passed into a holding tank to provide for the killing of parasitic protozoan Cysts which requires at least 20 minutes of contact time with a biocide, such as iodine/iodides, to destroy such cysts.

Iodinated resins, when used in sufficient quantity in a filter system having a properly engineered flow rate of water therethrough, are very effective in the destruction of microorganisms such as bacteria and viruses as long as the contact time of the biocide with the cell walls of the microorganisms is sufficient. If sufficient biocidal contact time is not provided, when the biocide is removed and biocidal action ceases, any remaining live microorganisms will survive and remain active in the drinking water. Since treatment of non-potable water can never be 100% effective, there is always some percentage of microorganisms which may escape destruction or removal. It is generally accepted therefore that the presence of minimal amounts of pathogenic organisms in potable water is inevitable and as the degree of contamination increases, the possibility that unacceptable levels of pathogens will escape treatment also increases.

SUMMARY OF THE INVENTION

The device of this invention has been designed to provide a water purification filter for safe, thorough and economical purification of non-potable water at a continuous, desirable flow rate.

It is an object of this invention to provide a device which can be installed directly in line in a cold water pipe line providing running water.

It is a further object of this invention to purify such running water of bacteria, most viruses, and protozoan cysts.

The filter of this invention, being located linearly aligned and attached in line in a cold water pipe line provides for continuous running water at a high water flow rate without the need for a settling/holding tank. The increased water flow through the filter of this invention can be thoroughly disinfected by providing a novel extended contact time chamber within the device rather than merely by increasing the quantity of biocidal resin in the water such as practiced in the prior art. The use of the extended contact time chamber allows for the continued contact and interaction between biocide in the water and microorganisms such that any partially treated microorganisms after passing through the biocidal resin chamber are given additional contact time with the biocide prior to removal of the biocide. This increased contact time while the water is constantly flowing allows for the higher water flow rate of this invention over devices of the prior art. The extended contact time chamber also allows the filter of this invention to perform efficiently when higher concentrations of contamination are found to be present in the water to be treated. The greater the cubic volume of the extended contact time chamber, the longer the continued biocide/microorganism contact time and the greater the flow rate without the need for the introduction of a greater cubic volume of biocide.

It is also an object of this invention to disinfect the water in a manner which offers greater economy by its use of less biocide than prior art systems and which allows for the complete or near complete removal of the biocide after disinfection of the water. The advantages of the device of this invention are two-fold: greater economy reduces the overall cost of the device while virtually complete removal of the biocide allows the user to employ the device for daily consumption of potable water since the water is free of unacceptable levels of biocide.

It is also a goal of this invention to provide a water-purifying filter which can be used with a pre-filtration system to effectively sterilize water of most of the common microorganisms which are found in non-potable water including *E. coli*, cholera bacteria, most common virus strains, and *Giardia lamblia* cysts. The device of this invention, in a preferred embodiment, can be installed generally in stationary water purification situations but can also be adapted for portable applications as well.

In use, the filter of this invention can receive pretreated water which has been treated for the removal of suspended solids, organic matter and chlorine such as by a silver-impregnated, granular activated carbon media bed. It is desirable to remove such material from the water before passing it through a biocidal resin because chlorine and other chemicals, if still present in the water prior to passing through a biocidal resin, reduce the life of, for example, iodinated resins. Also organic matter, if collected in the post-sterilization portion of the filter, would tend to increase the possibility for back-contamination of the device as described further below. Such pre-filter treatment can also be utilized to remove toxic chemicals and other contaminants. If one removes such organic contaminants through an activated carbon-type pre-filter, then only the later removal from the water of the remaining iodine/iodides after the biocide has acted on the microorganisms is necessary.

The device, being enclosed in a cylindrical pipe-like housing, can be installed in-line in a cold water pipe line and includes therein a series of linearly aligned chambers. In the filter water passes through a biocide chamber containing a biocide such as an iodinated resin. In such biocidal resin chamber the biocide such as iodine/iodide is released in the water, and the iodine/iodide interact with the microorganisms, destroying many of them as described above. As the water passes through the biocidal resin chamber, it acquires levels of iodine/iodides which are lethal to microorganisms. It is in the nature of such resin after a point not to release further biocide into such biocide-saturated water. Once the biocide has been introduced into the water and is encountered by the microorganisms, there is no additional benefit to be derived by having the water remain longer inside the biocidal resin chamber if the biocide/microorganism contact time can be extended without slowing the rate of water flow. The iodine/iodides should be removed from the water after having had sufficient contact with the microorganisms. In the case of iodinated resins, this must be at least two seconds. However, any immediate removal of the iodine/iodides after passing through the biocidal resin chamber will prematurely strip the biocide away from microorganisms prior to their complete destruction. Such premature removal defeats the intended function of the biocide since partially treated microorganisms quickly recover and reappear in the effluent water downstream of the treatment and can become even more problematic since most iodine/iodide removal medias have the potential to become breeding grounds for bacteria growth. Here the water carrying such iodine/iodide first interacts with the microorganisms and then passes through a special disk which causes a spinning action of the water to create a mixing, turbulent motion in the water as it is immediately entered into the extended contact time chamber the cubic dimensions of which are determined, as described below, according to the desired flow rate of purified water. The greater the volumetric capacity of the extended contact time chamber, the greater the resulting water flow rate without loss of performance so long as the primary contact within the iodinated resin bed is maintained at not less than two seconds. The function of the extended contact time chamber as described here is not to create an opportunity for additional and new contact between untreated microorganisms and the iodine/iodides. It is to allow microorganisms which have already come into direct contact with the biocide sufficient time to be completely destroyed prior to the removal of the biocide, since partially destroyed microorganisms can recover if the biocide is prematurely stripped away from the outer cell wall of the microorganism. Residual iodine/iodides in the water are so small that their presence cannot be relied upon to initiate further destruction of microorganisms which have not been treated in the primary iodinated resin bed. Once the water has passed through the biocidal resin chamber and has been caused to dwell within the extended contact time chamber, the microorganisms will be completely destroyed, and the only components in the water remaining to be removed are the biocide itself. The biocide is then absorbed out of the water when the water is passed into the next chamber containing granular activated carbon or a biocide removal media, which is commercially available for this purpose. After the water passes through the biocide removal chamber of the filter, it is passed through a separation pad to the last chamber of the filter, as discussed below, which contains bacteriostatic media.

It is yet a further goal of this invention to eliminate the problem of back contamination to prevent bacterial colonies present downstream of the water treatment device from spreading upstream to where they reach the effluent end of the filter and possibly contaminate the biocidal removal media used therein. One of the functions of the contents of such last chamber is to prevent bacterial back contamination that might spread from the downstream end of the filter. As mentioned above, it is desirable to pass the water first through a pretreatment of activated carbon prior to the disinfection treatment in the filter of this invention, and this activated carbon filtration also helps decrease the potential for back contamination since it removes organic matter prior to disinfection of the water. However, there is always some opportunity for back contamination which problem is solved in the filter of this invention through the use of a bacteriostatic media such as KDF-55 media or equivalent in such last chamber. Back contamination will not occur while the water is flowing through the device. However when the device is not being operated and water is standing therein, bacteria growth downstream of the device, such as at the mouth of the faucet, can spread back up into the device from its downstream end. The bacteriostatic media in the last chamber resists the entry and spread of such bacteria as it provides an inhospitable environment for such microorganisms and displays a biocidal quality itself. Such microorganisms reaching the device's effluent port are thus resisted and once the device is activated, such microorganisms are flushed downstream. If heavy metals are present in the water, KDF-55 media can also accomplish heavy metal reduction as described below.

Since *Giardia lamblia* cysts are highly resistant to biocidal resins but are a common problem in areas having non-potable water, a 3-micron screen is employed after the last chamber to retain this class of microorganisms in the filter as they cannot pass through such screen due to their being larger in size than the size of the openings in the screen.

The device of this invention meets its goals of a direct, constant flow, in-line water sterilizer without the necessity of a separate holding tank or complex channeling structures as the device allows for the continuous flow of water therethrough at usable high flow rates. It is thus a further goal of this invention to be able to provide flow rates greater than the flow rates of prior art filters not benefiting from the use of the extended contact time chamber of this invention. It is yet a further object of this invention that it will destroy bacteria, most viruses and retain *Giardia lamblia* cysts therein so that they will be eliminated from the resulting drinking water without the need for holding tanks which slow down the water flow rate considerably.

DESCRIPTION OF THE PREFERRED EMBODIMENT(S)

Figure 1:
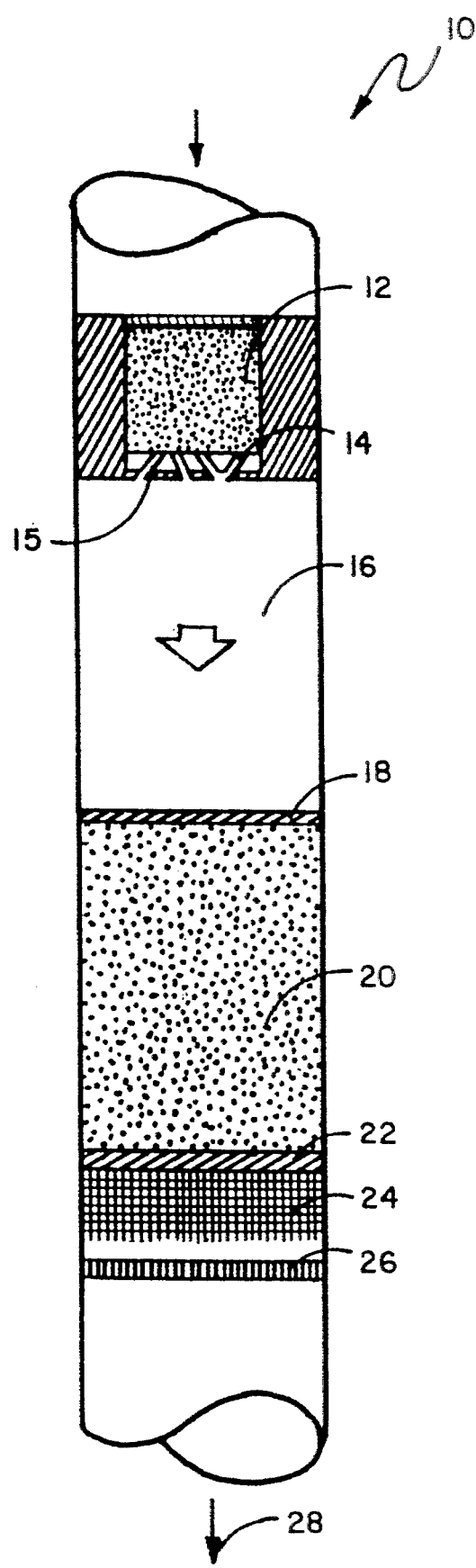
FIG. 1 illustrates a side view of the in-line filter of the device of this invention mounted on a cold water pipe having an inlet and an outlet.

FIG. 1 illustrates a side view of the cylindrical, continuous flow filter housing 10 of this invention mounted in-line in a cold water pipe having influent end 13 and effluent end 28. Filter housing 10 can be of any diameter and is preferably made of polypropylene. A typical filter diameter can be 1⅜-2½ inches. The chambers described below are linearly aligned within the filter housing, one after the other. In use, non-potable water entering the filter first passes through biocidal resin chamber 12, the diameter of which can be somewhat narrower than the diameter of filter housing 10. The water in chamber 12 is in%contact with the iodide/iodine from the biocidal resin, as described above which contact causes the microorganisms' cell membranes to rupture resulting in the microorganisms' destruction. The length of the biocidal resin chamber should be equal to, or greater than, its diameter. The flow rate must correspond to the cubic volume of the biocidal resin such that a minimum direct contact time of 2 seconds is accomplished between the biocidal resin and the microorganisms. The water is then passed through turbulating disk 14 which has a plurality of short, tubular openings 15 therein disposed at various angles to the length of the pipe and hence the direction of the water flow. The positioning of the tubular openings causes the water to pass therethrough in a turbulent fashion immediately into extended contact time chamber 16 which, when there is no water flow, is an empty portion of filter housing 10. Disk 14 can have, in one embodiment, several tubular openings provided at angles therein so that the water flow is given a turbulent, twisting action as it passes therethrough, creating a turbulence in the water within extended contact time chamber 16. Because of the length of the extended contact time chamber, the water is contained therein as it passes therethrough for a sufficient period of time to allow the iodinated resins to continue their killing action of the microorganisms until such microorganisms are completely destroyed.

It should be noted that the extended contact time chamber of this invention is not analogous to the holding tanks of the prior art. Holding tanks of the prior art contain non-potable water which passes through a high-residue biocide such as Pentapure brand resin during which time the water acquires a level of biocide of up to 13 ppm. Many holding tanks provide for the water to sit therein for a period of up to 2 minutes. Such high-residue resins tend to exhaust themselves prematurely and are later difficult to remove from the water because of their high concentration. The filter of this invention uses low-level residue resins such as MCV brand resin which imparts less than 4 ppm of biocide initially, gradually reducing such level to 2 ppm at which time such low-level residue biocide must be replaced. The holding tank filters of the prior art cannot work with such low-level residue resins, and it is the extended contact time chamber of this invention that makes it possible to use such low-level residue resins which allow for the later excellent biocide removal levels of this invention.

In the filter of this invention cysts are retained in the filter housing by a 3-micron screen 26 or screen having smaller apertures, as will be described further below, and are not destroyed.

The water flow rate through the device of this invention is increased dramatically over the flow rate of the prior art by using the extended contact time chamber 16 in the linear, in-pipe-line filter of this invention with low level residue biocidal resins. What is destroyed in the device of this invention in the extended contact time chamber are the microorganisms which remain therein for a longer time in contact with the iodine/iodide of the biocidal resin as the water flow passes through extended contact time chamber 16 until the water passes through Separation pad 18 into biocidal removal media chamber 20 which media, in some embodiments, can be activated carbon or a special resin designed for such purpose. The cubic volume of the biocidal removal media should be generally at least three to five times the cubic volume of the biocidal resin where at least a 99% removal rate is desired. A greater volume ratio of biocidal removal media to biocidal resin can be utilized if a greater water flow rate is desired. After the iodine/iodide is removed in the biocidal removal media chamber 20, the water then passes through a second separation pad 22 into the back contamination barrier chamber 24. Chamber 24 can contain at least 1 inch of bacteriostatic media such as KDF-55 media which is a commercial product produced by KDF Company, 126 S. Washington Street, Constantine, Mich. 49042 or equivalent media. KDF-55 media is a proprietary mixture of Zinc and copper heated and flaked into tiny pieces which, as water is passed therethrough, provides for an exchange of ions because of an oxidation reduction process which is initiated therein such that heavy metals in the water attach to the zinc/copper complex of the KDF-55 media as the water passes therethrough. Also, since such media is slightly bacteriocidal, it acts as an excellent barrier to prevent back contamination by keeping bacteria from entering the filter from downstream of effluent end 28.

Extended contact time chamber 16 is the key to the success of the invention herein as water is not required to remain stationary therein as required in prior art holding tanks since screen 26 is used for cyst retention within the filter housing, allowing the cysts to be collected and retained without needing long time periods of chemical action to destroy them. The longer the length of extended contact time chamber 16 within the device of this invention, the greater the period of contact time of the iodine/iodide in the biocidal resin with microorganisms present in the water. The cubic volume of the extended contact time chamber has been determined to allow sufficient additional iodine/iodide/microorganism contact time at a level of 12 cubic inches of volume to safely destroy 99.9999% of all bacteria and most virus strains at a minimum flow rate of 1.5 liters per minute. If the flow rate is to be increased, the cubic volume of the primary iodinated resin bed must be established to provide a minimum initial contact of two seconds, while the extended contact time chamber should be increased to 12 cubic inches for each 1.5 liters of flow rate. A flow rate of 3 liters per minute would then require an extended contact time chamber of not less than 24 cubic inches.

This ability of the present invention to provide a high flow rate is a key feature of this invention which can purify water by providing an extended contact time chamber, easily accommodating an increased flow rate while still maintaining a thorough destruction microorganisms in the water.

Although the present invention has been described with reference to particular embodiments, it will be apparent to those skilled in the art that variations and modifications can be substituted therefor without departing from the principles and spirit of the invention.

I claim:

1. A filter for disinfecting non-potable water containing organic contaminants including microorganisms, protozoan cysts, and inorganic contaminants for use with a water delivery pipe having an influent end and an effluent end, comprising:

a filter housing disposed in line in said water delivery pipe through which said water flows, said filter housing having an influent end and an effluent end, said filter housing including:

a biocide chamber having a length and cubic volume and containing biocidal resin disposed at said influent end of said filter housing through which chamber said water passes, said water being in contact with said biocide for at least 2 seconds and picking up a level of biocide;

an extended contact time chamber having a length and cubic volume disposed in line in said housing and in communication with and positioned after said biocidal resin chamber, said extended contact time chamber defining means to extend the contact time of said biocide with said microorganisms in said water as said water and biocide pass through said extended contact time chamber;

means to cause turbulence of said water and biocide in said extended contact time chamber including a turbulating disk, said disk having a plurality of tubular apertures defined therein at angles to the direction of water flow, said water flow through said apertures creating a turbulating circulation of said water and biocide for a period of time within said extended contact time chamber;

a biocidal removal chamber having a length and cubic volume, said biocidal removal chamber containing media for the removal of biocides from said water as said water passes therethrough, said biocidal removal chamber disposed in line after, and in communication with, said extended contact time chamber;

a bacteriostatic chamber having a length, said bacteriostatic chamber containing a bacteriostatic media that is inhospitable to bacterial growth, said chamber disposed in line in said filter housing in communication with and positioned after said biocidal removal chamber wherein said bacteriostatic media acts to prevent back contamination upstream from said effluent end of said filter housing; and a screen disposed in line in said filter housing and after said chamber containing bacteriostatic media, said screen having a plurality of apertures defined therein of a size of 3 microns or smaller for catching and retaining protozoan cysts in said filter housing as said water passes through said screen and out said effluent end of said filter housing.

2. The filter of claim 1 wherein said extended contact time chamber has cubic volume of at least 12 cubic inches for each 1.5 liters per minute of water flow.

3. The filter of claim 2 wherein said cubic volume of said biocidal resin chamber defines a means for providing at least 2 seconds of contact time between said water and said biocide.

4. A filter for disinfecting non-potable water containing pathogenic microorganisms, including bacteria, virus and protozoan cysts, for use with a water delivery pipe having an influent end and an effluent end, comprising:

a filter housing disposed in line in said water delivery pipe through which said water flows, said filter housing having an influent end and an effluent end, said filter housing including:

a biocide chamber having a length and cubic volume and containing biocidal resin disposed at said influent end of said filter housing through which chamber said water passes, said water picking up a level of biocide;

an extended contact time chamber having a length and cubic volume disposed in line in said housing and in communication with and positioned after said biocidal resin chamber, said extended contact time chamber defining means to extend the contact time of said biocide with said microorganisms in said water as said water and biocide pass through said extended contact time chamber;

a biocidal removal chamber having a length and cubic volume, said biocidal removal chamber containing media for the removal of biocides from said water as said water passes therethrough, said biocidal removal chamber disposed in line after, and in communication with, said extended contact time chamber;

a screen disposed in line in said filter housing and after said biocidal removal chamber, said screen having a plurality of apertures defined therein of a size providing means for catching and retaining protozoan cysts in said filter housing as said water passes through said screen and out said effluent end of said filter housing; and further including means for causing turbulence of said water and biocide in said extended contact time chamber including a turbulating disk, said disk having a plurality of tubular apertures defined therein at angles to the direction of water flow, said water flow through said apertures creating a turbulating circulation of said water and biocide for a period of time within said extended contact time chamber.

5. The filter of claim 4 wherein said extended contact time chamber has cubic volume of at least 15 cubic inches for each 1.5 liters per minute of water flow.

6. The filter of claim 4 further including means for said cubic volume of biocidal resin to be in contact with said water for at least 2 seconds.

7. The filter of claim 4 further including:

a bacteriostatic chamber having a length, said bacteriostatic chamber containing a bacteriostatic media that is inhospitable to bacterial growth, said chamber disposed in line in said filter housing in communication with and positioned after said biocidal removal chamber wherein said bacteriostatic media acts to prevent back contamination upstream from said effluent end of said filter housing; and wherein said apertures in said screen each has a size of 3 microns or less.

8. The filter of claim 7 further including means for said bacteriostatic media to interact with said water by chemically combining with said water to reduce heavy metal contaminants in said water.

* * * * *